United States Patent [19]

Shimonaga

[11] Patent Number: 5,105,348
[45] Date of Patent: Apr. 14, 1992

[54] PRINTING APPARATUS, AND FACSIMILE APPARATUS USING STANDARD OR FINE MODES

[75] Inventor: Sadaaki Shimonaga, Nara, Japan

[73] Assignee: Sharp Kabushiki Kaisha, Osaka, Japan

[21] Appl. No.: 566,601

[22] Filed: Aug. 13, 1990

[30] Foreign Application Priority Data

Aug. 17, 1989 [JP] Japan .................................. 1-212161
Aug. 17, 1989 [JP] Japan .................................. 1-212162
Aug. 17, 1989 [JP] Japan .................................. 1-212163
Aug. 17, 1989 [JP] Japan .................................. 1-212167

[51] Int. Cl.$^5$ .................. H04N 1/21; H04N 1/23; H04N 1/40; G01D 15/10
[52] U.S. Cl. .................................. 358/296; 358/486; 346/76 PH
[58] Field of Search ............... 358/296, 434, 445, 451, 358/486; 346/76 PH

[56] References Cited

U.S. PATENT DOCUMENTS

| 4,737,860 | 4/1988 | Ono et al. | 346/76 PH |
| 4,875,056 | 10/1989 | Ono | 346/76 PH |
| 4,894,843 | 1/1990 | Yoshida et al. | 358/434 X |

Primary Examiner—Benjamin R. Fuller
Assistant Examiner—Eric Frahm
Attorney, Agent, or Firm—David G. Conlin; Castle, Donald R.

[57] ABSTRACT

A printing apparatus prints image on thermosensible paper by means of thermosensible elements (H1 to Hn). When printing data is supplied from a central processing circuit (28) to a printing data correcting circuit (52), the printing data correcting circuit performs signal processing referring to printing data supplied in response to shifting operation of a shift register (S). The printing data is latched in a latch circuit (53) for each printing operation and the latched printing data is stored in the shift register and supplied to the thermosensible elements, whereby the printing data is printed on the thermosensible paper driven by a pulse motor (57).

5 Claims, 16 Drawing Sheets

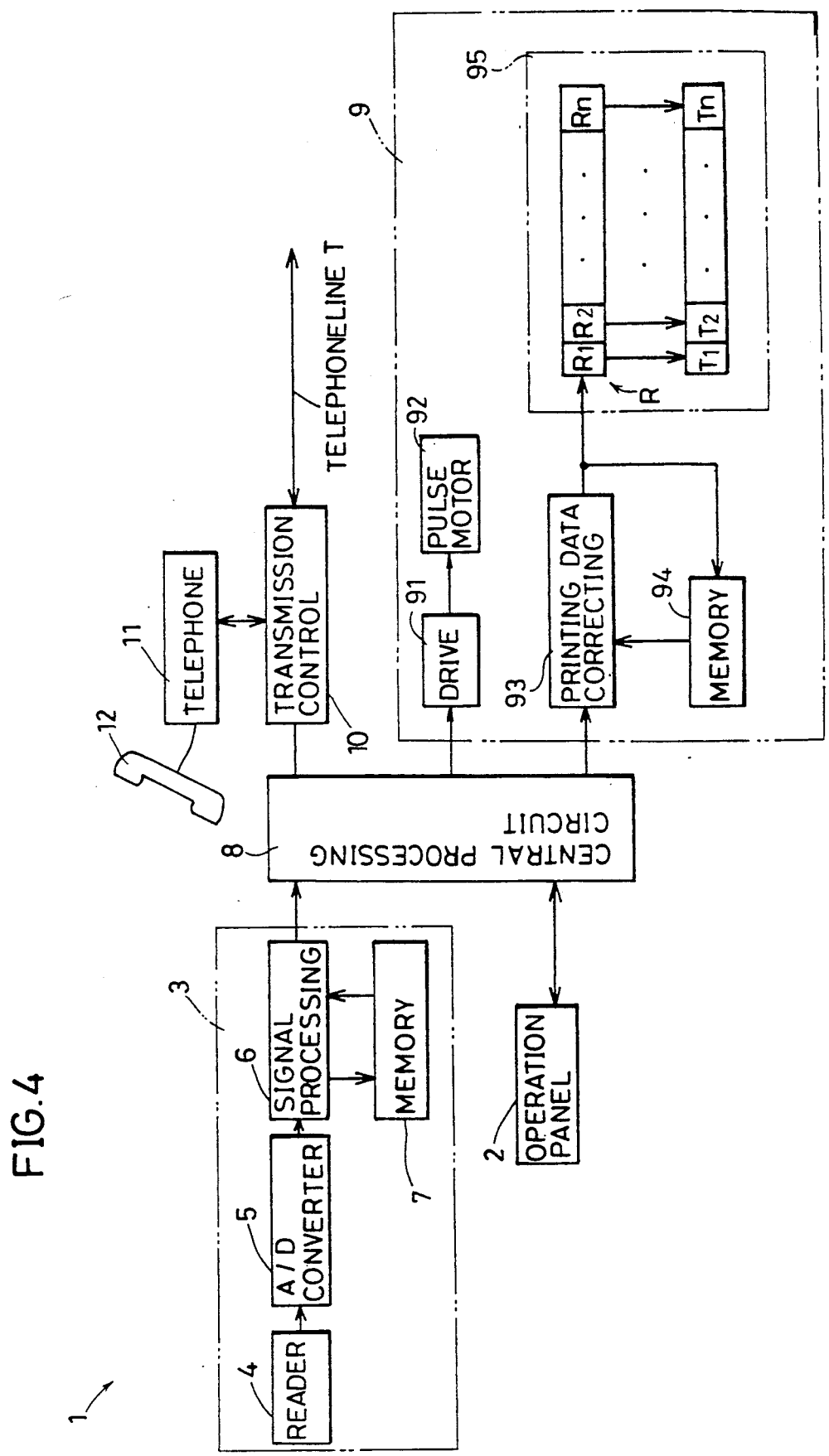

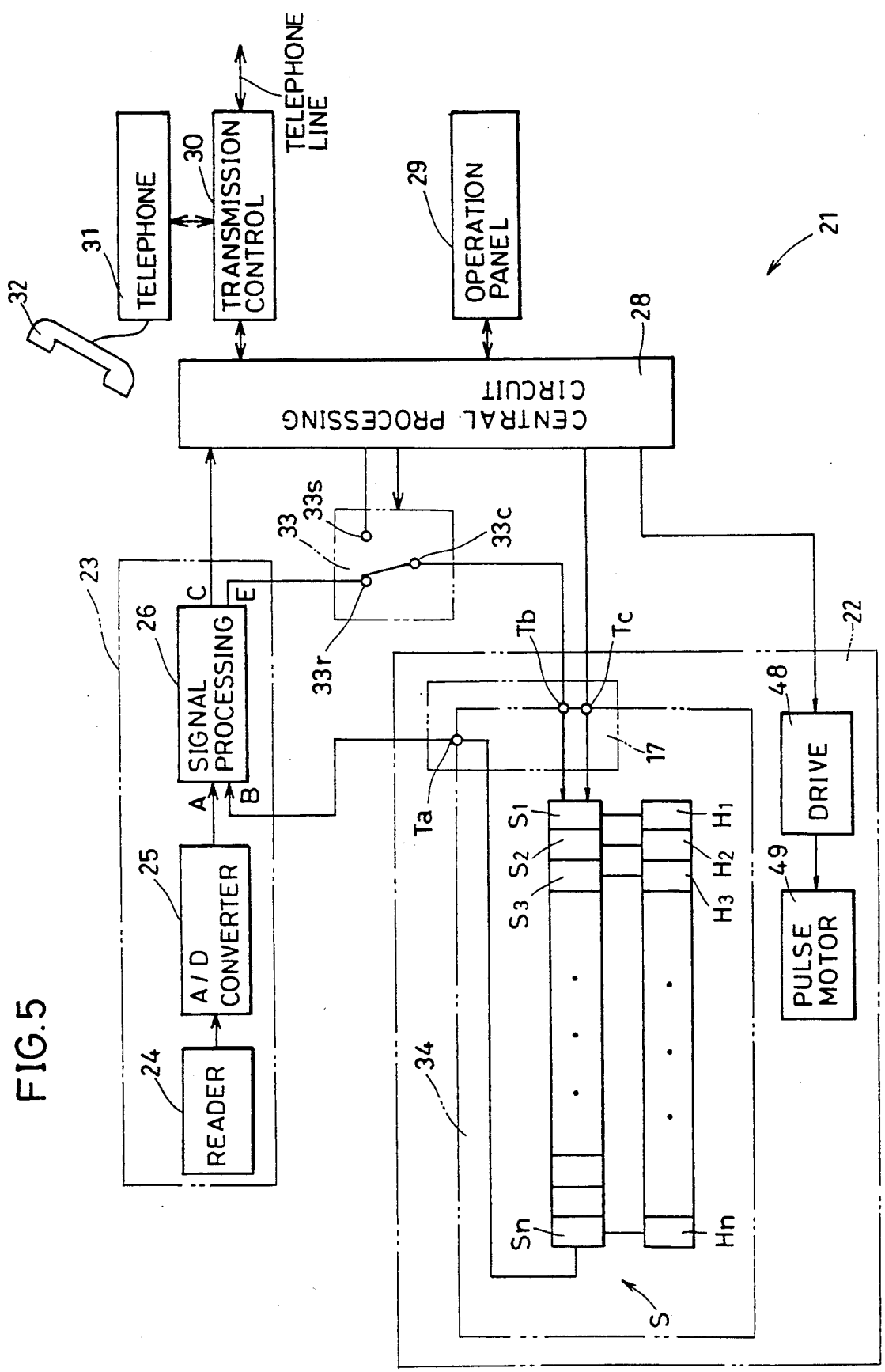

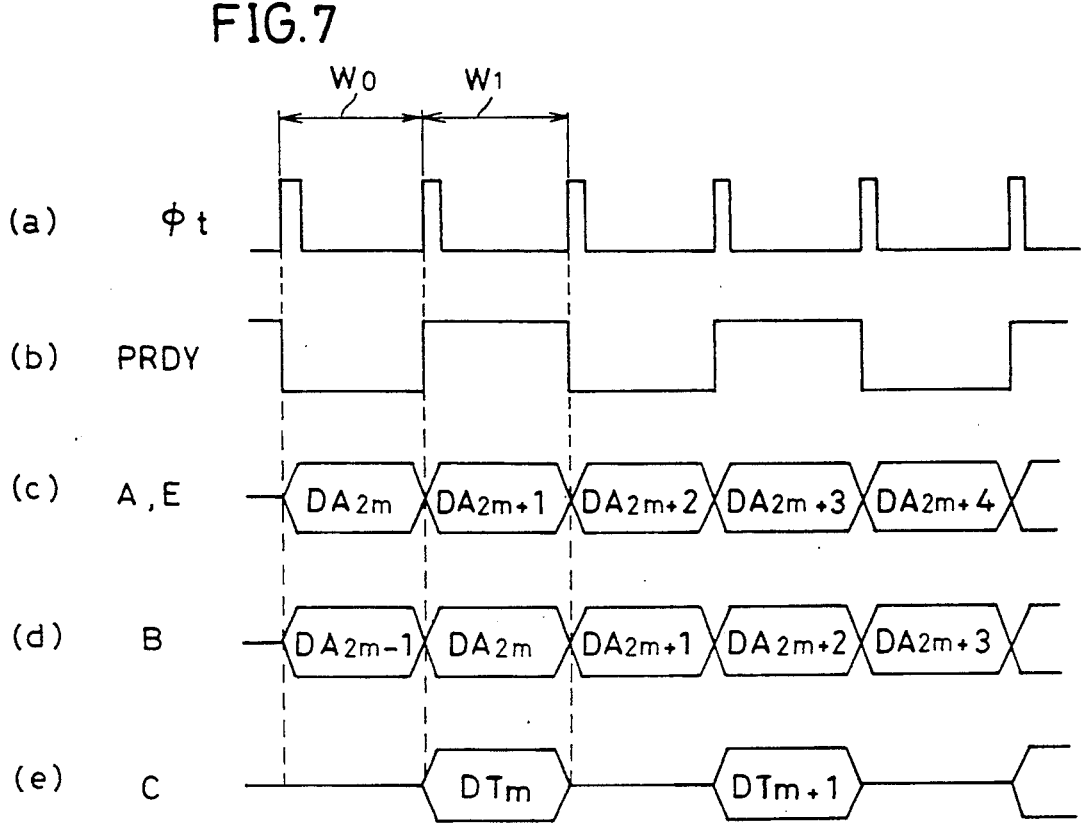
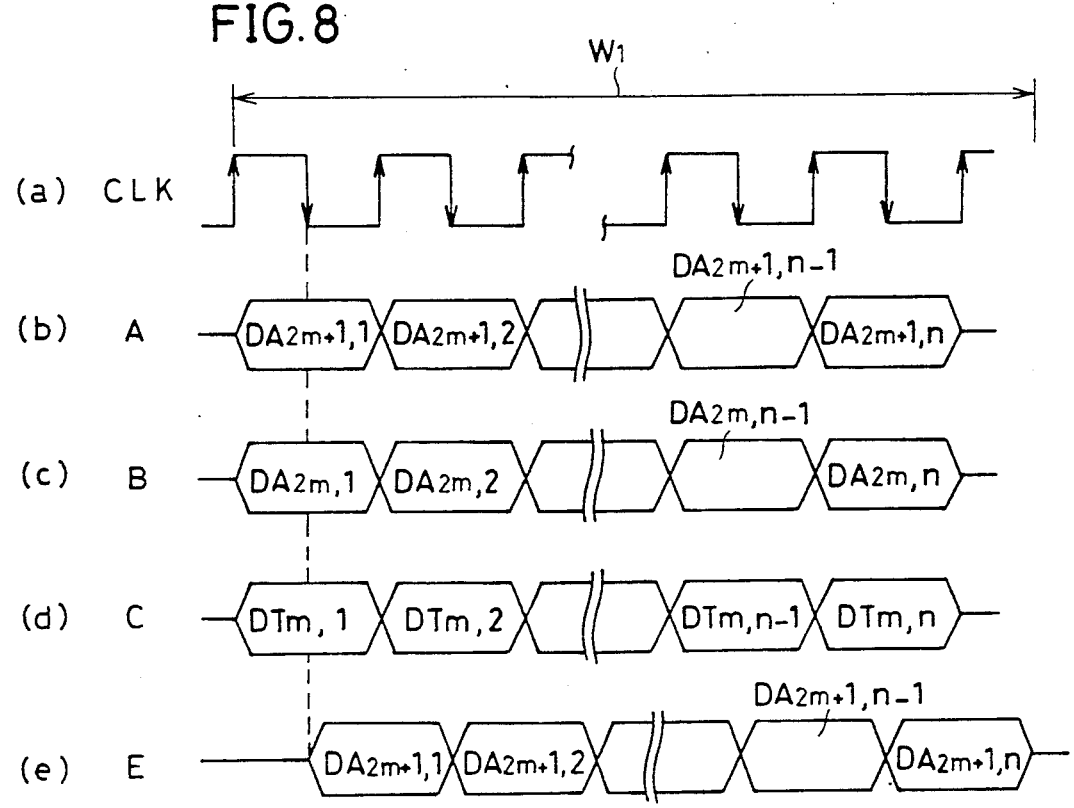

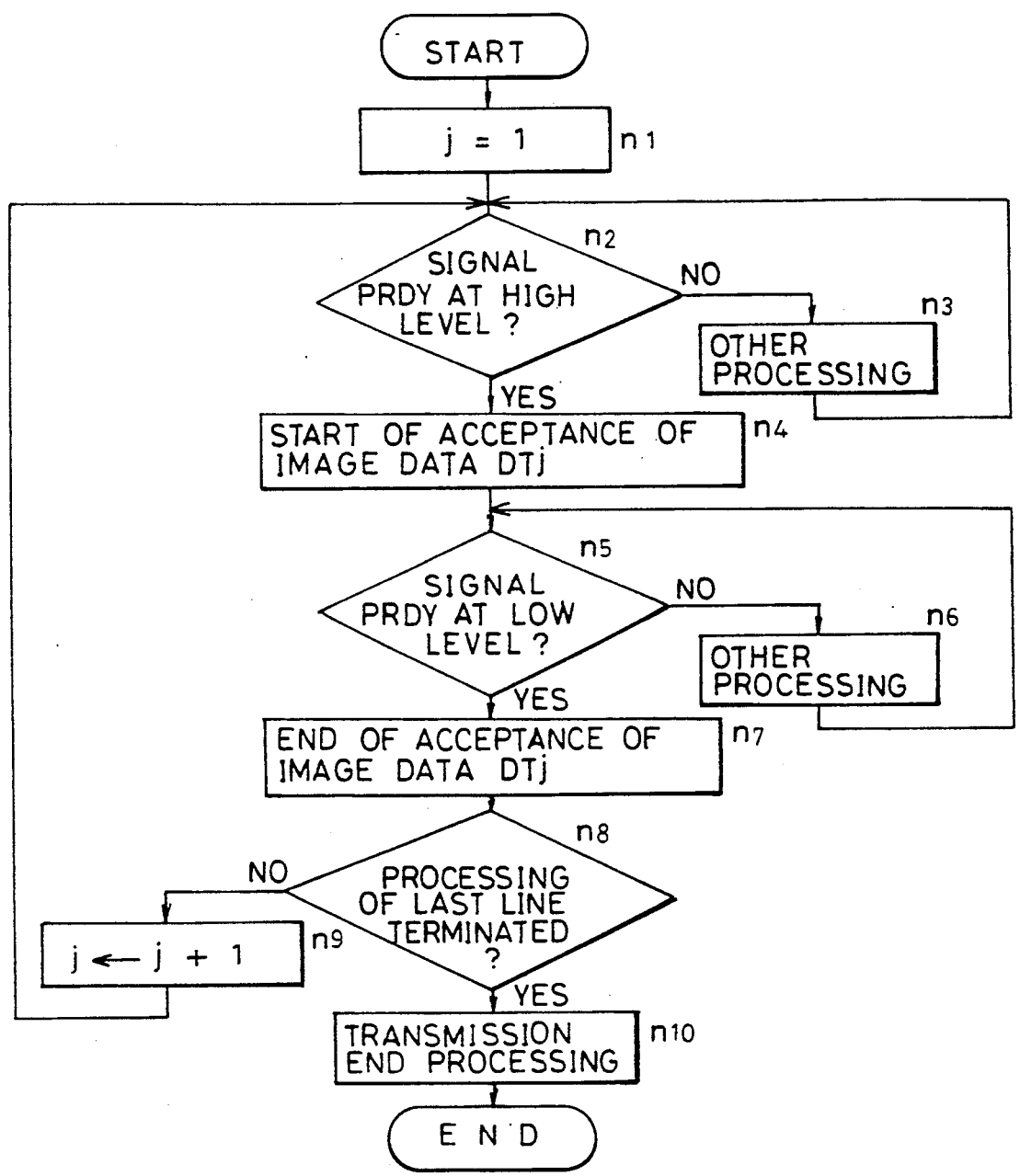

PRINTING APPARATUS, AND FACSIMILE APPARATUS USING STANDARD OR FINE MODES

BACKGROUND OF THE INVENTION

1. Field of the Invention

The present invention relates to a printing apparatus and a facsimile apparatus using the same. More particularly, the present invention relates to a printing apparatus for use in a facsimile apparatus which communicates data according to a communication system normalized for example by CCITT (International Telegraph Telephone Consultative Committee), and to a facsimile apparatus using the printing apparatus.

2. Description of the Background Art

Recently, facsimile apparatus have been widely utilized not only in offices but also in homes, and it is strongly desired to reduce the sizes and costs. Therefore, in compliance with such desire, a facsimile apparatus needs to have a simplified structure and a reduced number of components.

Meanwhile, in order to communicate image data between facsimile apparatuses of different types, communication of image data by facsimile apparatus needs to be performed according to a communication system normalized by CCITT for example. In the communication system called GIII normalized by CCITT, there are provided a standard image data communication mode called a standard mode, and a mode enabling communication of image data of high definition called a fine mode.

FIGS. 1A to 1D are diagrams for explaining image reading operation in a conventional facsimile apparatus. As shown in FIG. 1A, if a line 14 exists on an original 41, the original image is read by reading means such as a one-dimensional contact type image sensor arranged along the horizontal direction in FIG. 1A while the original 41 is being carried in the direction shown by the arrow 42. In this case, in the standard mode, an area having a width L1 is regarded as one line and reading operation is performed for each line successively. Thus, reading operation for one line is performed in the order of line 13, line 12 and line 11. A printing form of the image data thus read is shown in FIG. 1B. Referring to FIG. 1B, pixels to be used for printing are shown as the hatched areas. In the line 13, as for the pixels in the left end region in FIG. 1B, where the line 14 shown in FIG. 1A extends horizontally as a thin line, it is determined that the data represents non-printing because of a low threshold level at the time of reading the image. In addition, as for the pixels near the region between the lines 11 and 12 in the line 14 and the region between the lines 12 and 13 in the line 14, the image data represents non-printing. Accordingly, if the image of the original 41 is thus read, the image data of the line 14 is transmitted in a broken manner as shown in FIG. 1B.

FIG. 1C shows original reading operation in the fine mode. If the original 41 shown in FIG. 1A is to be read in the fine mode, reading operation is performed by regarding an area having a width L2 half of the above-mentioned width L1 as one line. Thus, reading operation for the respective lines is performed successively in the order of the lines 13b, 13a, 12b, 12a, 11b, 11a, whereby the printing form based on the read image data becomes relatively approximate to the image of the original 41 as shown in FIG. 1C. In this case, the threshold level at the time of reading the image is a level for the width L2 and even if a relatively thin line is read, the data is not determined to be non-printing. Thus, image reading in the standard mode involves a disadvantage that at the time of transmitting the image of the original 41 having a horizontal thin line for example, the horizontal thin line would disappear.

Normally, a facsimile apparatus is provided with a line type thermal head and image data transmitted from a facsimile apparatus on the other side is thermally printed on thermal printing paper by means of this line type thermal head. Such a line type thermal head includes a plurality of heating elements arranged in one line and those heating elements are selectively heated based on printing data.

FIGS. 2A and 2B are diagrams for explaining printing operation in a conventional facsimile apparatus. Particularly, FIG. 2A represents the fine mode and FIG. 2B represents the standard mode. FIGS. 3A and 3B are diagrams for explaining a smoothing process of printing operation in the facsimile apparatus.

Referring to those figures, a plurality of heating elements Tj (j=1, 2, ..., n) are arranged horizontally in the facsimile apparatus and printing paper 44 as thermal printing paper is fed on those heating elements Tj in the direction of the arrow 43. Each of the heating elements Tj has a width L1 in the feeding direction of the printing paper 44, namely, in the direction of the arrow 43, and when printing for one line by the heating elements Tj is terminated, the printing paper 44 is fed by the width L1 in the direction of the arrow 43. Thus, in the fine mode, printing is performed based on the image data corresponding to each of the lines 11, 12 having the width L1.

In the standard mode, one line 13 has a width L2 twice larger than the width L1 as shown in FIG. 2B. Consequently, one line 13 cannot be printed by one printing operation by the heating elements Tj of the width L1 and two printing operations are performed based on the image data for one line. Thus, based on the image data for one line, printing operation for the area shown by 13b is performed first and then after the printing paper 44 is fed by the width L1, printing operation for the area shown by 13a is performed. After that, the printing paper 44 is further fed by the width L1 and printing operation for the subsequent line is performed. Such printing operations are repeated, whereby an image is printed on the printing paper 44.

However, in the case of the standard mode in which two printing operations are performed based on the same printing data, there are caused step portions between the respective lines as shown in FIG. 3A and thus it is not possible to print an image of a high definition. In FIG. 3A, the hatched area represents a printed image.

FIG. 4 is a schematic block diagram showing a conventional facsimile apparatus in which an improvement has been made in reading and printing of image data. Referring to FIG. 4, the facsimile apparatus 1 includes: an operation panel 2 provided with input key groups and so on; a reading unit 3 for reading an image of an original; a central processing circuit 8 for performing operation such as coding and decoding of image data; a printing unit 9 for printing the image on printing paper; and a transmission control circuit 10 for controlling line connection and the like. In addition, in order to enable the facsimile apparatus 1 to have a telephone function, a telephone circuit 11, a handset 12 and the like are connected to the transmission control circuit 10.

Next, description will be made of a case in which the facsimile apparatus 1 reads an original image and transmits the image in the standard mode. The reading unit 3 includes a reader 4 such as a one-dimensional contact type image sensor, an A/D converter 5, a signal processing circuit 6, and a memory 7. An original image is read by the reader 4 for each line of the same width L2 as that in the fine mode. An analog signal from the reader 4 is converted by the A/D converter 5 to binary data. The signal processing circuit 6 stores image data for one line into the memory 7 and performs signal processing such as calculation of a logical sum between the image data of the line outputted from the A/D converter 5 and the image data of the line stored in the memory 7. For example, the above-mentioned image data of the line 13b shown in FIG. 1C is stored in the memory 7 and a logical sum between this image data and the image data of the line 13a supplied next is calculated for each pixel. In consequence, by reading operation for two lines as in the fine mode, the signal processing circuit 6 outputs image data for one line. The result of the processing is outputted as binary data to the central processing circuit 8. This binary data is coded in the central processing circuit 8 and the coded data is modulated in the transmission control circuit 10, whereby it is transmitted to the telephone line T in a communication system of the standard mode.

Thus, in the facsimile apparatus 1, in order to transmit an original image in the standard mode, the original image is read for each line of the width L2 in the same manner as in reading operation in the fine mode. Signal processing in the signal processing circuit 6 is performed by calculating a logical sum for the image data in the lines 11a and 11b as shown in FIG. 1C for example. Similarly, logical sums are calculated between the lines 12c and 12b and between the lines 13a and 13b. Accordingly, the printing form based on the image data obtained after such signal processing is as shown in FIG. 1D. Thus, in the case of transmitting an image in the standard mode in the facsimile apparatus 1, even if the original 41 contains a thin line in the horizontal direction, the image data can be transmitted without causing any problem such as disappearance of the thin line.

As described above, in the case of transmitting an original image in the standard mode in the conventional facsimile apparatus 1, the special memory 7 is required as a storage area for applying the above-mentioned signal processing to the image data read by the reader 4, which causes disadvantages such as a high cost and a large size of the apparatus. In addition, at the time of transmitting image data, the telephone line T is connected for the transmission of the image data and it can not receive image data from other facsimile apparatus, making it impossible to use the printing unit 9. Thus, at the time of transmitting image data, the printing unit 9 is not used and thus the structure involves a loss, causing deterioration of the efficiency of use of the facsimile apparatus 1.

Next, printing operation in the facsimile apparatus 1 shown in FIG. 4 will be described. The printing unit 9 includes: a drive circuit 91; a pulse motor 92 driven by the driver circuit 91 for feeding the printing paper; a printing data correcting circuit 93 for correcting printing data supplied from the central processing circuit 8 and supplying the corrected printing data; a memory 94 for storing the printing data supplied from the printing data correcting circuit 93; and a printing head 95. In the standard mode, the central processing circuit 8 supplies binary data of one line for two printing operations. The printing data correcting circuit 93 makes a correction of the printing data supplied from the central processing circuit 9, referring to printing data stored in the memory 94. Consequently, the printing data correcting circuit 93 supplies different printing data for each printing operation. The printing head 95 includes a plurality of printing elements T1 to Tn, and a shift register R having cells Ri corresponding to the respective printing elements Ti (i=1, 2, ..., n). The printing data supplied from the printing data correcting circuit 93 is supplied to the shift register R and the printing data for one printing operation is stored in the cells R1 to Rn. The heating elements Ti are selectively heated based on the data stored in the cells Ri, so that one printing operation is performed. After that, the central processing circuit 8 controls the pulse motor 92 through the drive circuit 91, so that the printing paper 44 is fed by the width L1 and the subsequent printing operation is performed.

In the above-described facsimile apparatus 1, the printing data correcting circuit 93 and the memory 94 are provided and even if image data is transmitted in the standard mode, smoothing processing is applied to the printing data and pixels 45, 46 as shown in FIG. 3A are printed. Accordingly, the printing form is as shown in FIG. 3B and a boundary between the non-printing area and the printing area for example becomes smooth. Thus, it is possible to print an image of a relatively high definition.

However, in the above-described facsimile apparatus, the printing data correcting circuit 93 refers to the already supplied printing data and thus the dedicated memory 94 is required, which causes the apparatus to be expensive and makes it difficult to reduce the size of the apparatus.

SUMMARY OF THE INVENTION

Therefore, a main object of the present invention is to provide a printing apparatus which is small-sized and inexpensive, without causing deterioration of a printing equality.

Another object of the present invention is to provide a facsimile apparatus using a printing apparatus as mentioned above.

A further object of the present invention is to provide a facsimile apparatus capable of reading an image of an original with high precision.

Briefly stated, the present invention includes a printing apparatus which prints an image by performing repeatedly two printing operations while feeding printing paper based on printing data for one line using a plurality of printing elements. In this printing apparatus, signal processing is applied to first printing data supplied from a printing data output circuit and second printing data for one line is supplied and stored in a shift register for each printing operation, whereby the image is printed by a printing head. The signal processing circuit applies signal processing to the first printing data supplied from the printing data output circuit, referring to printing data for one line supplied in response to shifting operation of the shift register, and supplies second printing data for one line for each printing operation.

Therefore, according to the present invention, it is possible to apply signal processing to printing data referring to printing data in an adjacent line without using any special memory, and to make a printing apparatus small-sized without causing deterioration in a printing quality. Thus, by incorporating such a printing apparatus in a facsimile apparatus, it is possible to make the facsimile apparatus small-sized and inexpensive.

More preferably, the signal processing circuit applies signal processing to the first printing data referring to the printing data which is the first printing data of one line ahead, supplied from the shift register, and outputs the second printing data.

More preferably, the plurality of printing elements are divided into a predetermined number of groups and, in response to a drive signal generated from a drive signal generating circuit, corresponding printing elements are driven according to the printing data stored in the corresponding shift register.

The facsimile apparatus according to the present invention includes: a shift register including storage areas corresponding to the respective printing elements for storing image data for one line; an image reading circuit for reading the image of the original for one line; a signal processing circuit for performing signal processing with respect to first image data supplied from the image reading circuit and supplying the processed data as second image data; and a selection circuit for selecting between the first image data from the image reading circuit and third image data from a telephone line and supplying the selected data to the shift register. At the time of transmission, the selection circuit is switched to the image reading circuit and the first image data is stored in the shift register, so that the second image data supplied from the signal processing circuit is transmitted to the telephone line. At the time of reception, the selection circuit is switched to the telephone line and the third image data from the telephone line is supplied to the shift register, so that the third image data is printed by the plurality of printing elements.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a schematic block diagram showing a conventional facsimile apparatus improved in reading operation and printing operation of image data.

FIG. 5 is a schematic block diagram of an embodiment of the present invention.

FIG. 7 is a timing chart for explaining operation of the signal processing circuit shown in FIG. 6.

FIG. 8 is a timing chart showing signals in the period W1 shown in FIG. 7.

FIG. 9 is a flow chart for explaining operation of the central processing circuit shown in FIG. 5.

DESCRIPTION OF THE PREFERRED EMBODIMENTS

Figure 6:
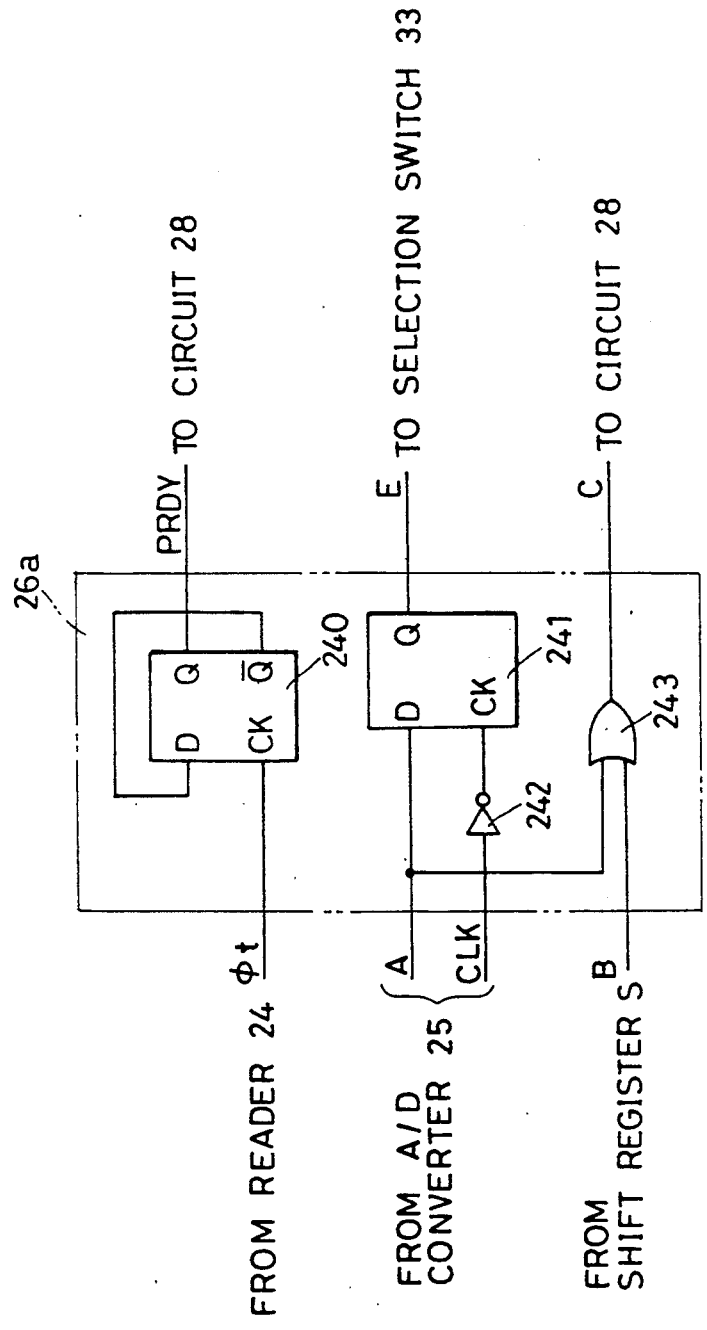
FIG. 6 is a specific block diagram of the signal processing circuit shown in FIG. 5.

FIG. 5 is a schematic block diagram of an embodiment of the present invention and FIG. 6 is a specific block diagram of the signal processing circuit shown in FIG. 5.

Referring to FIG. 5, a facsimile apparatus 21 comprises: a printing unit 22 for printing an image on printing paper; a reading unit 23 for reading the image of the original; a central processing circuit 28 for performing processing such as coding and decoding of image data; an operation panel 29; a transmission control circuit 30 for controlling line connection and the like; and a selection switch 33. This facsimile apparatus 21 communicates image data by the GIII communication system.

In the following, description will be made of the case in which the facsimile apparatus 21 reads and transmits an image of an original. The reading unit 23 includes a reader 24 such as a one-dimensional contact type image sensor, an A/D converter 25, and a signal processing circuit 26. An original image is read by the reader 24 for each line of a width Lb. An analog signal from the reader 24 is converted to binary image data A by the A/D converter 25 and the image data A is outputted therefrom. In the fine mode, the signal processing circuit 26 processes the image data A and supplies the processed data as image data C to the central processing circuit 28. In the standard mode, the signal processing circuit 26 processes the image data A for one line to supply image data E to a contact $33r$ of the selection switch 33. At this time, the selection switch 33 renders the contact $33r$ and a common contact $33c$ conductive. In consequence, signal processing is performed with respect to the image data A of the line outputted successively from the A/D converter 25 and the image data B of the line stored in a shift register S. The result of the processing is supplied as the image data C to the central processing circuit 28.

In the central processing circuit 28, the binary data is coded and then the data is modulated in the transmission control circuit 30 so as to be transmitted to a telephone line T. The above-mentioned operation is performed by keying of input key groups and the like provided on the operation panel 29. The transmission control circuit 30 is connected with a telephone circuit 31 and a handset 32 or the like so that it performs a telephone function.

In the following, the structure and printing operation of the printing unit 22 will be described. The printing unit 22 includes a printing head 34, a drive circuit 48, and a pulse motor 49 for feeding printing paper. The image data supplied from the telephone line T is demodulated in the transmission control circuit 30 and the data is decoded by the central processing circuit 28, so that it is supplied to the selection switch 33. At this time, the selection switch 33 is set by the central processing circuit 28 to a state conducting the contact 33s and the common contact 33c. Thus, the image data outputted from the selection switch 33 is supplied to the shift register S through a terminal Tb of a connector 17.

The shift register S has cells S1 to Sn corresponding to heating elements H1 to Hn, respectively. Thus, the image data is successively shifted in response to serial clock pulses CLK supplied from the central processing circuit 28 through the terminal Tc of the connector 17. In order to print the image data, the respective heating elements H1 to Hn are heated based on data in the corresponding cells S1 to Sn. After printing for one line is terminated, the central processing circuit 28 drives the pulse motor 49 for one line (corresponding to the width of each of the heating elements) by means of the drive circuit 48, so that the printing paper is fed. In the standard mode, two printing operations are performed based on image data for one line for example. These printing operations correspond to printing operation for two lines in the fine mode.

In association with the signal processing in the reading operation, the data from the cell Sn of the shift register S is successively supplied to the signal processing circuit 26 through a terminal Ta of the connector 17. Thus, the shift register S is also used in the reading operation in the standard mode.

FIG. 7 is a timing chart for explaining the operation of the signal processing circuit shown in FIG. 6. Referring to FIGS. 6 and 7, description will be made of the signal processing circuit for performing signal processing using the shift register S. FIG. 6 is an equivalent circuit diagram in the case of communication in the standard mode, and hereinafter only the case of the standard mode will be described. The signal processing circuit 26a includes flip-flops 240, 241, an inverter 242 and an OR circuit 243. A pulse signal $\phi t$ having a pulse for reading operation for one line in the fine mode is supplied to a clock input terminal CK of the flip-flop 240. The pulse signal $\phi t$ is shown in (a) of FIG. 7.

An output terminal $\overline{Q}$ and an input terminal D of the flip-flop 240 are connected, and a signal PRDY outputted from the flip-flop 240 has rectangular waves where high and low levels are repeated for reading operation for each line. The image data A outputted from the A/D converter 25 is supplied to the input terminal D of the flip-flop 241 and is also supplied to one input terminal of the OR circuit 243. The serial clock pulse CLK outputted from the A/D converter 25 is inverted by the inverter 242 and the inverted clock pulse is supplied to the input terminal CK of the flip-flop 241. Accordingly, the image data A is supplied from the flip-flop 241 as image data E delayed by half a cycle of the serial clock pulse. For example, as shown in (c) of FIG. 7, image data DA2m of the 2mth line in reading operation in a period Q0 is supplied as the image data A, E. The image data E from the flip-flop 241 is supplied to the contact 33r of the selection switch 33. As described above, the image data B from the shift register S through the terminal Ta of the connector 17 is supplied to the other input terminal of the OR circuit 243. An output of the OR circuit 243 is provided as the image data C to the central processing circuit 28.

Since the image data B is delayed by the shift register S by one line, image data DA2m−1 of the 2m−1th line is supplied as the image data B in a period W0 and the image data DA2m of the 2mth line is supplied as the image data B in a period W1 as shown in (d) of FIG. 7. The image data C is obtained by calculating a logical sum between the adjacent lines and it is accepted by the central processing circuit 28 only when the signal PRDY is at high level. A logical sum between the image data C and the signal PRDY may be calculated and outputted. Consequently, as for the image data C, image data DTm of the mth line in the standard mode is supplied in the period W1 as shown in (e) of FIG. 7.

Referring now to a timing chart in FIG. 8, operation in the period W1 will be described. The serial clock pulse CLK from the A/D converter 25 is shown in (a) of FIG. 8. In synchronization with this serial clock pulse CLK, the image data A is outputted from the A/D converter 25. If data corresponding to the ith pixel of the 2m+1th line is represented as DA2m+1, i, the image data A is as shown in (b) of FIG. 8. The image data E is delayed by half the cycle of the serial clock pulse CLK from the image data A as shown in (e) of FIG. 8. The image data B in the period W1 is the image data of the 2mth line as shown in (c) of FIG. 8. This image data B is outputted in synchronization with the serial clock pulse CLK. Since the OR circuit 243 obtains the logical sum of the image data A and the image data B, data of the respective pixels provided as the image data C are represented as follows:

$$DTm, i = DA2m, i \vee DA2m+1, i$$

where "v" represents a logical sum.

The image data C is as shown in (d) of FIG. 8.

FIG. 9 is a flow chart for explaining the operation of the central processing circuit 28 shown in FIG. 5. Referring to the flow chart of FIG. 9, description will be made of the operation of the central processing circuit 28 in the standard mode of the facsimile apparatus 21. In the facsimile apparatus 21, an original is set in an original stacker (not shown) and a destination facsimile number is entered by pressing input key groups or the like provided on the operation panel of the facsimile apparatus 21 for example. Then, the telephone line is connected and the original is fed. At this time, in step n1, a value of a parameter j representing a line number is set to "1". In step n2, it is determined whether the signal PRDY is at high level or not. If the signal PRDY attains high level, the program proceeds to step n4 to perform interruption processing as described later. If the signal PRDY is at low level, other processing operation such as coding of image data of the central processing circuit 28 is performed in step n3.

In step n4, the central processing circuit 28 starts to accept image data DTj of the jth line supplied from the signal processing circuit 26 as the image data C by interruption processing. If the signal PRDY is not at low level in step n5, other processing operation is performed in step n6. Thus, in this case, acceptance of the image data DTj and other processing operation are performed simultaneously. If the signal PRDY is at low level in step n5, the acceptance of the image data DTj is terminated in step n7. After that, it is determined in step n8 whether processing of the last line is terminated or not. If the processing of the last line is not terminated, the program proceeds to step n9, where the value of the parameter j is incremented and then the program returns to step n2, so that the same operation as described above is repeated. If an upstream end in the feeding direction of the original is detected and the processing of the last line for reading the original is terminated in step n8, the program proceeds to step n10, where prescribed transmission end processing is performed and the telephone line is disconnected. Thus, the original image data transmission operation is terminated.

Thus, in the facsimile apparatus 21 according to the embodiment of the present invention, the same operation as reading operation in the fine mode is performed to read the original image.

Figure 10A:
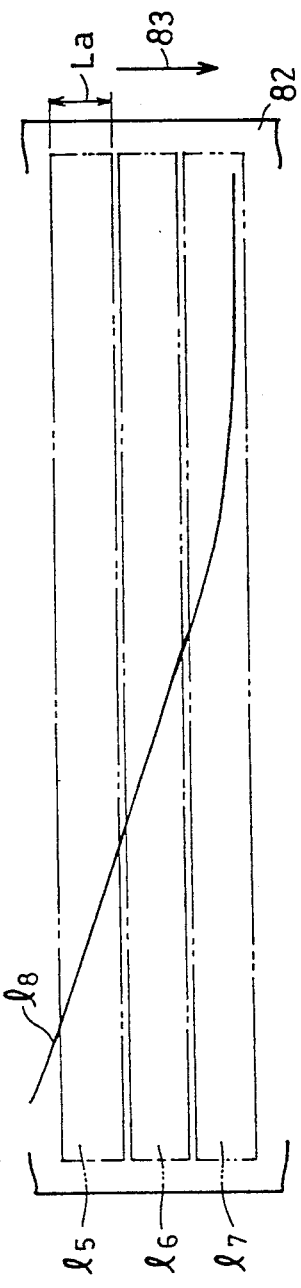
FIGS. 10A to 10C are diagrams for explaining original reading operation in the facsimile apparatus shown in FIG. 5.
Figure 10B:
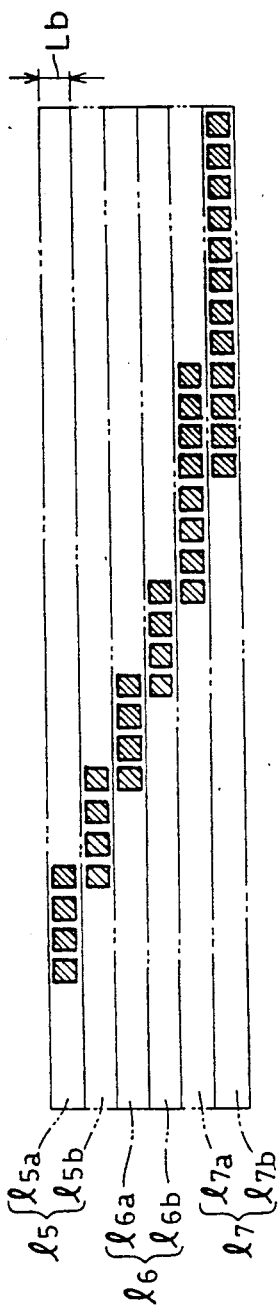
Figure 10C:
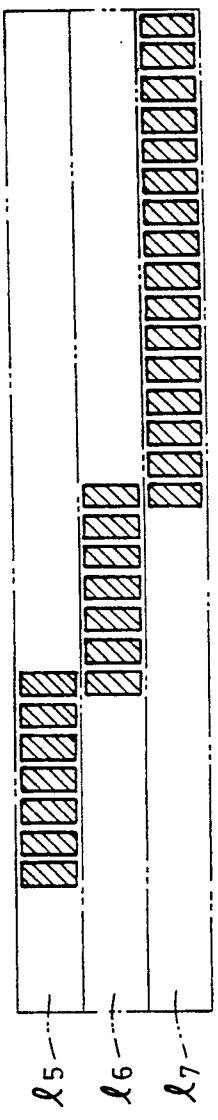

FIGS. 10A to 10C are diagrams for explaining the original reading operation by the facsimile apparatus 21 shown in FIG. 5. The above-described facsimile apparatus 21 performs the same operation as the reading operation in the fine mode to read the image of the original. For example, if a line 18 exists in the original 82 as shown in FIG. 10A, the image is read while the original 82 is being fed in the direction shown by the arrow 83. Each of the areas having a width La shown by the lines 15, 16, 17 represents an area to be read for one line in the standard mode. In this embodiment, each of the lines 15, 16, 17 is divided into two areas having a width Lb, namely, 15a, 15b; 16a, 16b; 17a, 17b so as to be read, as shown in FIG. 10B. After that, the signal processing circuit 26 obtains a logical sum of the image data of the lines 15a and 15b for example, and printing is performed as shown in FIG. 10C in the facsimile apparatus of the destination based on the output image data.

Therefore, according to this embodiment, if an original has a thin line in the direction perpendicular to the original feeding direction, the image data can be transmitted without causing disappearance of the thin line. In addition, since a special memory or the like for such signal processing is not required, the facsimile apparatus can be effectively made small-sized and the cost of production can be reduced.

Figure 11:
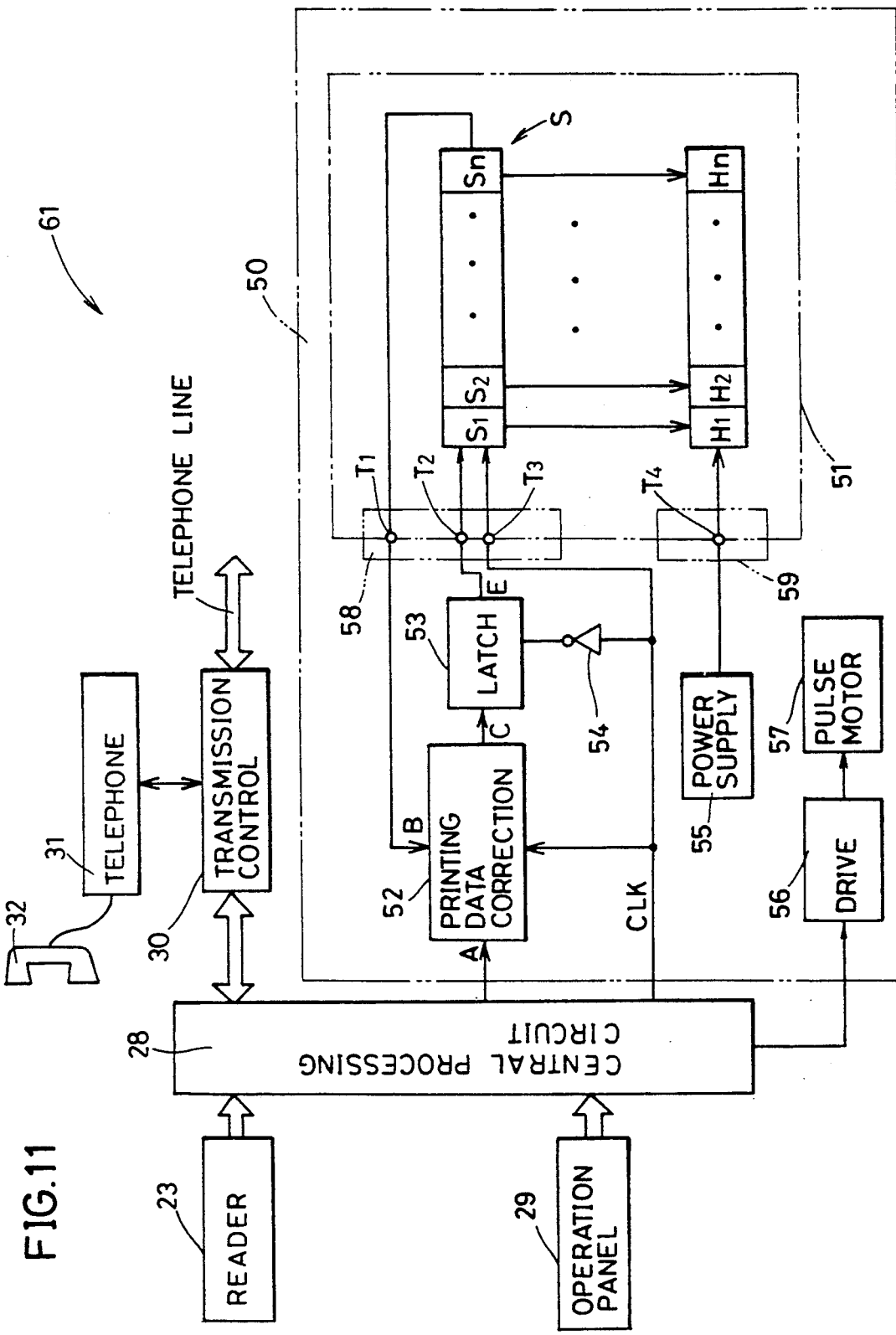
FIG. 11 is a schematic block diagram of another embodiment of the present invention.

FIG. 11 is a schematic block diagram of another embodiment of the present invention. Referring to FIG. 11, a reader 23, a central processing circuit 28, an operation panel 29, and a transmission control circuit 30 of this embodiment are structured in the same manner as shown in FIG. 5, except for a printing unit 50. In the following, the structure of the printing unit 50 will be described. The printing unit 50 includes: a printing data correcting circuit 52 which makes a correction as described below on printing data A supplied from the central processing circuit 28; a latch circuit 53 which latches printing data C supplied from the printing data correcting circuit 52; and a printing head 51 having a shift register S and printing elements H1 to Hn. The printing data A supplied from the central processing circuit 28 is supplied to the printing data correcting circuit 52 in synchronization with the serial clock pulse CLK. The printing data correcting circuit 52 corrects the printing data A referring to the printing data B supplied from the printing head 51 as described below and supplies the corrected data as printing data C to the latch circuit 53. A signal obtained by inversion of the serial clock pulse CLK by an inverter 54 is supplied to the latch circuit 53, from which printing data E is supplied to a terminal T2 of a connector 58 of the printing head 51 with a delay corresponding to half a cycle of the serial clock pulse CLK from the printing data C. The serial clock pulse CLK is also supplied to a terminal T3 of a connector 59 of the printing head 51.

Printing data E supplied from the latch circuit 53 in synchronization with the serial clock pulse CLK of the above-mentioned terminal T3 is supplied to the shift register S of the printing head 51, whereby printing data for one printing operation is stored in the respective cells S1 to Sn of the shift register S. The cells S1 to Sn of the shift register S are connected to heating elements H1 to Hn, respectively, and those heating elements H1 to Hn are activated according to the data in the corresponding cells S1 to Sn by electric power supplied from a power supply 55 through a terminal T4 of the connector 59. A drive circuit 56 and a pulse motor 57 are provided in the printing unit 50 to feed printing paper.

Figure 12:
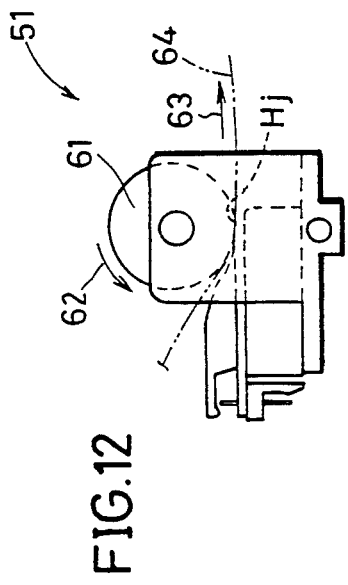
FIG. 12 is a side view of a printing head.
Figure 13:
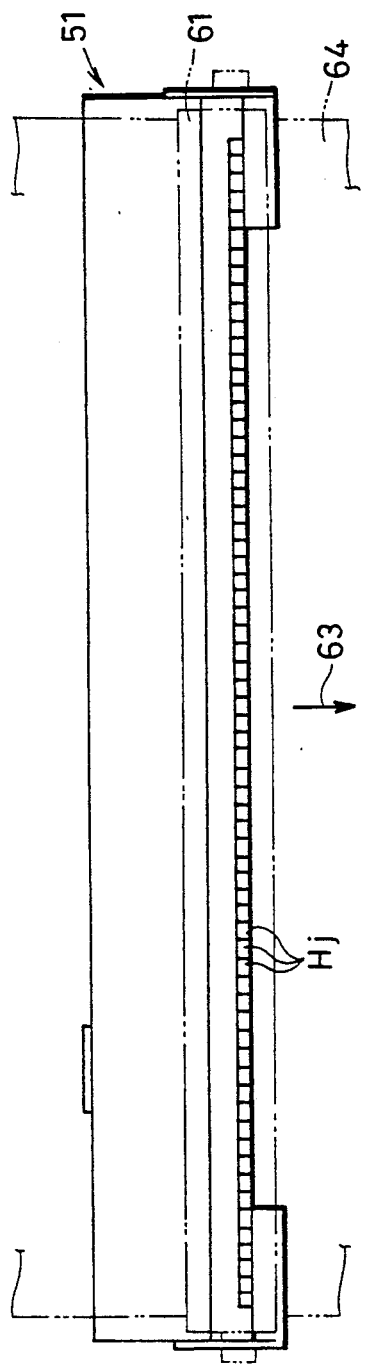
FIG. 13 is a plan view of the printing head.
Figure 14:
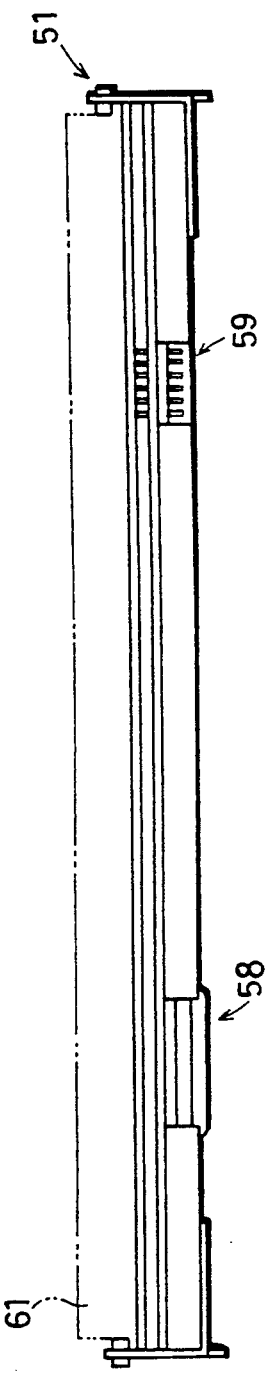
FIG. 14 is a back view of the printing head.

FIG. 12 is a side view of the printing head 51, FIG. 13 is a plan view thereof, and FIG. 14 is a back view thereof.

Referring to FIGS. 12 to 14, the heating elements Hj are arranged in the longitudinal direction in the printing head 51 as shown in FIG. 13. A platen roller 61 is disposed on a surface opposite to the heating elements Hj and printing paper 64 is held between the platen roller 61 and the heating elements Hj. The platen roller 61 is rotated in the direction of the arrow 62 by the above-mentioned pulse motor 57, so that the printing paper 64 is fed in the direction of the arrow 63. At this time, the central processing circuit 28 controls a cycle of a pulse signal supplied to the pulse motor 57 according to a transmission period of image information for one line or the like. This enables normal printing of an original image even if a printing speed for one line changes. By selective heating of the heating elements Hj in such a state, the image is printed on the printing paper 64.

The rear surface of the printing head 51 has a connector 58 through which the printing data E or the like is entered, and a connector 59 through which electric power from the power supply circuit 55 is supplied to the respective heating elements Hj.

Figure 15:
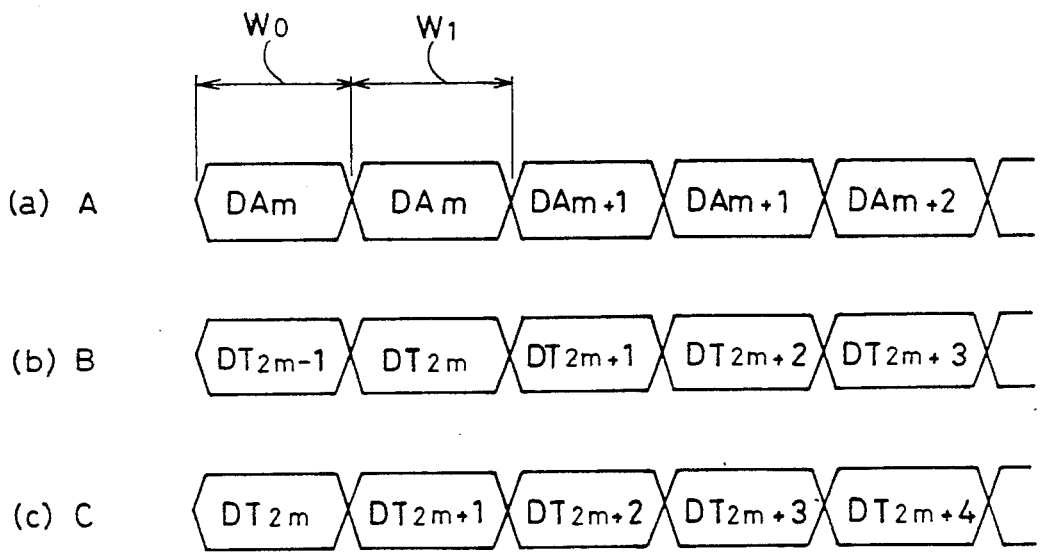
FIG. 15 is a timing chart for explaining operation of the printing data correcting circuit shown in FIG. 11.
Figure 16:
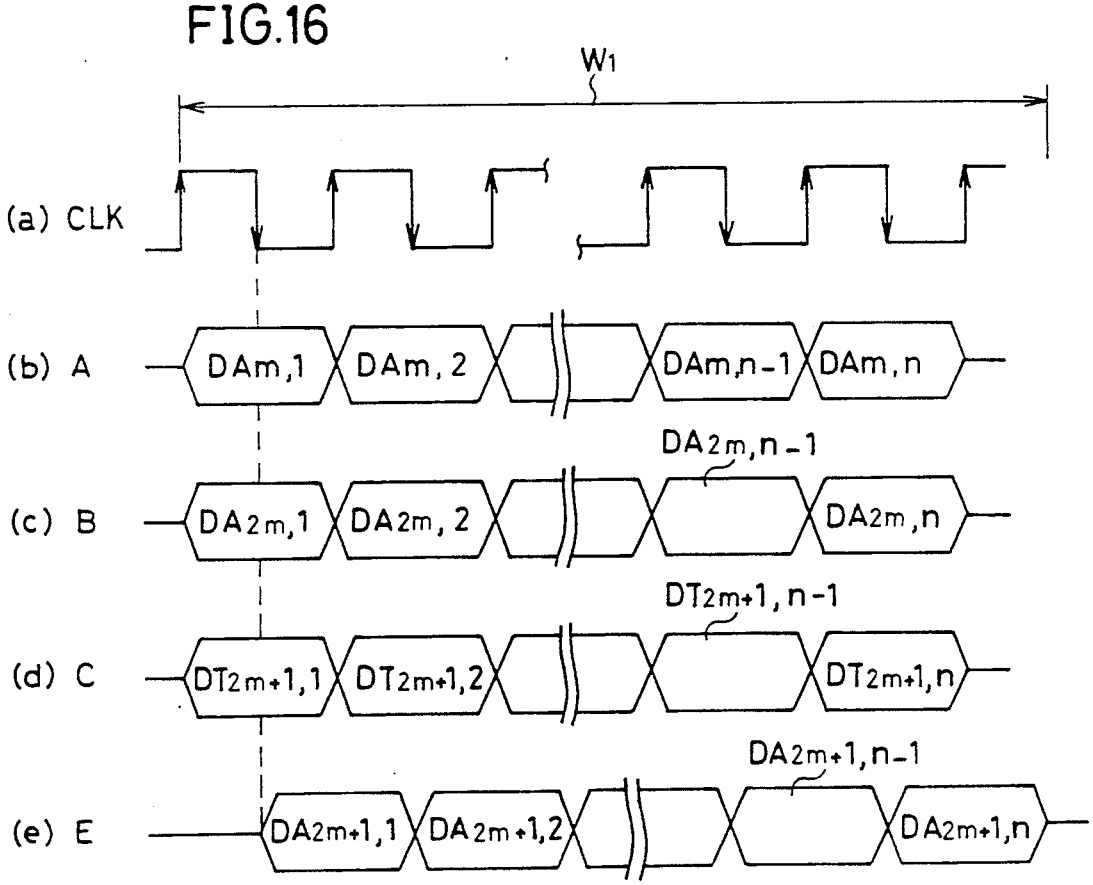
FIG. 16 is a timing chart showing signals in the period W1 shown in FIG. 15.

FIG. 15 is a timing chart for explaining operation of the printing data correcting circuit 52 shown in FIG. 11, and FIG. 16 is a timing chart showing the signals in the period W1 shown in FIG. 15.

In the following, with reference to the timing chart shown in FIG. 15, description will be made of image data input/output operation timing in the printing data correcting circuit 52 in the standard mode. For example, in the period W0, the central processing circuit 28 supplies, as the printing data A, printing data DAm of the mth line. The printing data A is as shown in (a) of FIG. 15. At this time, as shown in (b) of FIG. 15, the printing data B supplied from the shift register S is printing data DT2m−1 of the second printing operation of the line coming one line ahead, namely, the m−1th line. The printing data correcting circuit 52 corrects the printing data DAm referring to the printing data DT2m−1. Printing data DT2m obtained by the processing is supplied as printing data C to the latch circuit 53. The printing data C is as shown in (c) of FIG. 15.

Next, in the period W1, if the standard mode is selected, the same printing data DAm as in the period W0 is inputted as the printing data A. The printing data DT2m outputted as the printing data C in the period W0 is supplied as the printing data B, and the printing data DT2m+1 is supplied as the printing data C to the shift register S. In the first line, the printing data B is not supplied from the shift register S and the printing data A is supplied as the printing data C to the shift register S.

Input/output of the printing data A, B, C to and from the printing data correcting circuit 52 are performed in synchronization with the serial clock pulse CLK. The serial clock pulse CLK is as shown in (a) of FIG. 16. In the period W1, data DAm,1 to DAm,n corresponding to the number of the heating elements are supplied as the printing data A to the printing data correcting circuit 52 in synchronization with the serial clock pulse CLK as shown in (b) of FIG. 16.

The printing data DA2m,1 to DA2m,n stored in the shift register S in the period W0 are supplied as the printing data B to the printing data correcting circuit 52. The printing data B are as shown in (c) of FIG. 16. The printing data correcting circuit 52 applies smoothing processing as described below for example to the printing data A referring to the printing data B and supplies the processed data as the printing data C to the latch circuit 53. The printing data C are printing data DT2m+1,1 to DT2m+1,n for the second printing operation of the mth line as shown in (d) of FIG. 16. The latch circuit 53 delays the printing data by half the cycle of the serial clock pulse CLK and supplies the delayed data as printing data E shown in (e) of FIG. 16.

Figure 1A:
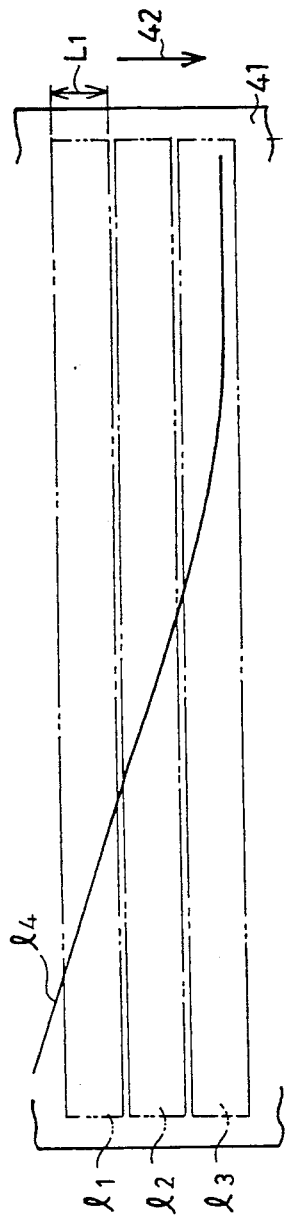
FIGS. 1A to 1D are diagrams for explaining image reading operation in a conventional facsimile apparatus.
Figure 1B:
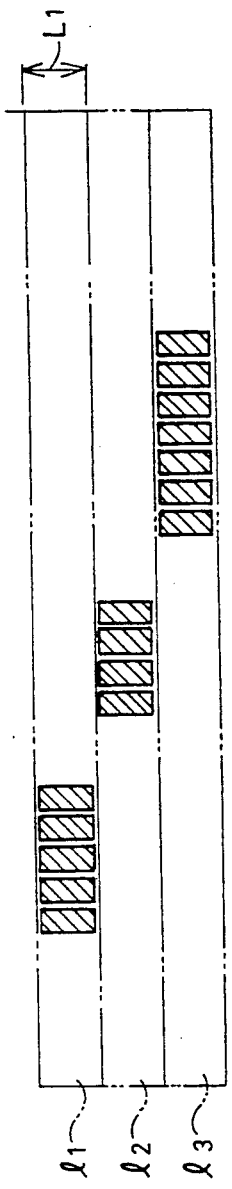
Figure 1C:
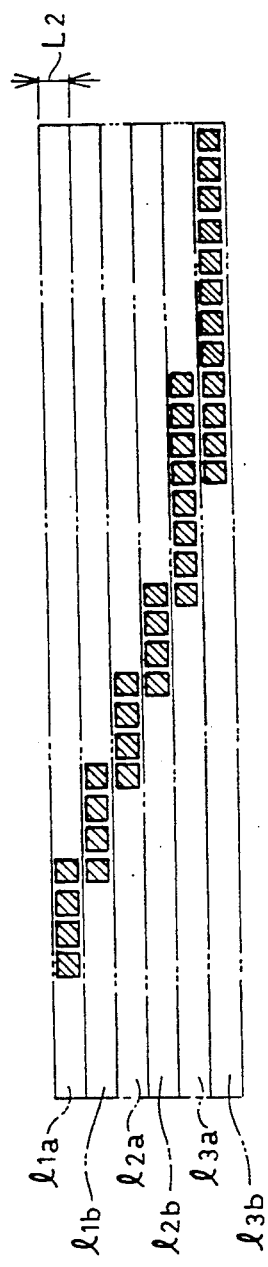
Figure 1D:
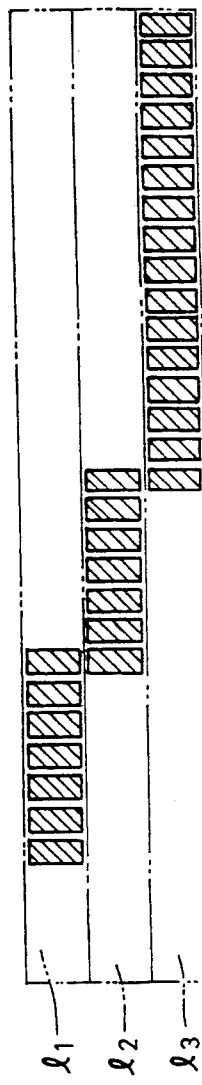
Figure 2A:
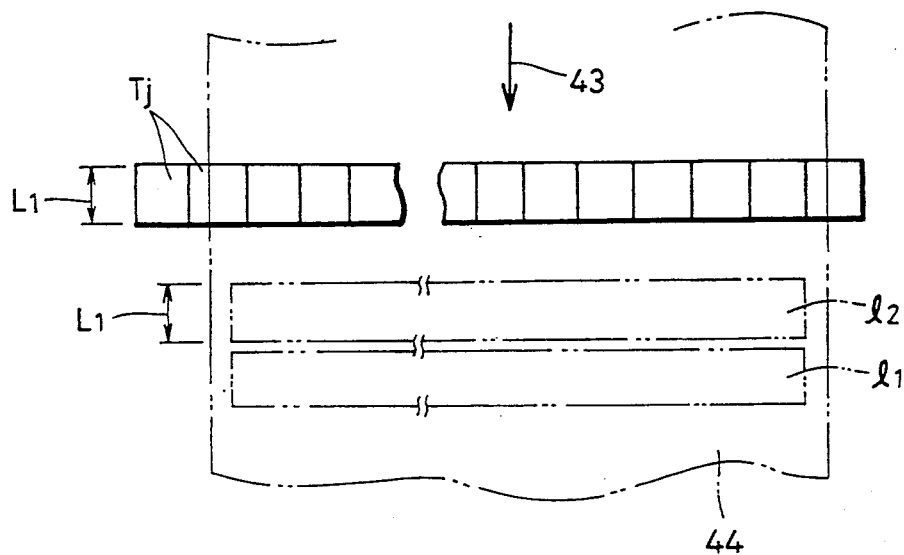
FIGS. 2A and 2B are diagrams for explaining printing operation in the conventional facsimile apparatus.

Next, referring to FIGS. 2A, 2B, 3A and 3B mentioned above, the smoothing processing in the printing data correcting circuit 52 will be described. As shown in FIG. 2A, a plurality of heating elements $Hj$ ($j=1, 2, \ldots, n$) are arranged in the transverse direction and printing paper 44 is fed over the heating elements $Hj$ in the direction of the arrow 43. Each of the heating elements $Hj$ has a width L1 in the feeding direction 43 of the printing paper 44 and when one printing operation by the heating elements $Hj$ is terminated, the printing paper 44 is fed by the width L1 in the direction of the arrow 43. In the fine mode, printing for each line l1, l2 having the width L1 is performed based on the image data corresponding to each line l1, l2 as shown in FIG. 2A.

Figure 2B:
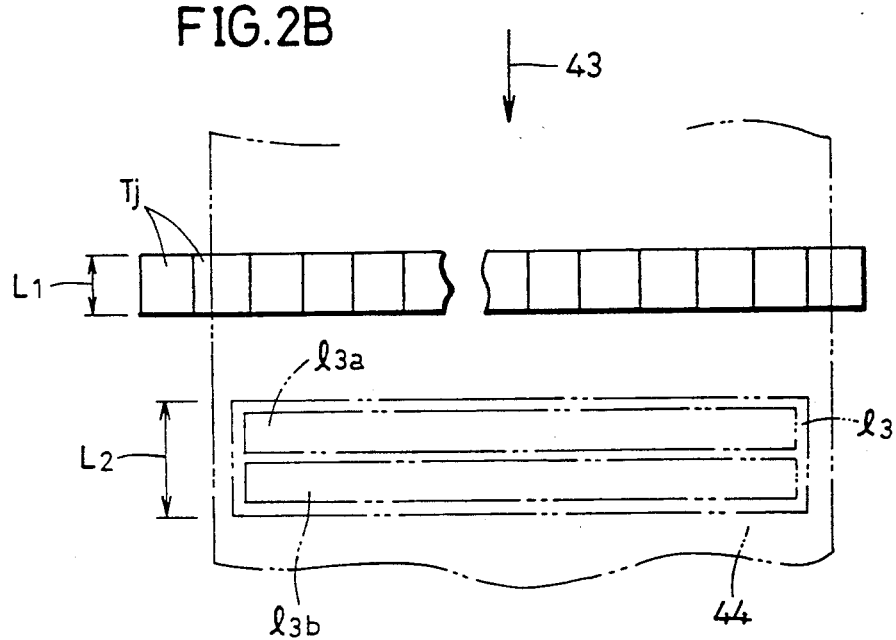

In the standard mode, one line l3 has a width L2 twice larger than the width L1 as shown in FIG. 2B. Accordingly, by using the heating elements $Hj$ of the width L1, it is not possible to print an area of one line l3 by one printing operation and therefore two printing operations are performed based on the image data for one line. More specifically, first, printing operation for the area l3b is performed based on the image data for one line and then after the printing paper 44 is fed by the width L1, printing operation for the area l3a is performed. After that, the printing paper 44 is further fed by the width L1 and the printing operation for the next line is performed. These operations are repeated, whereby the image is printed on the printing paper 44.

Figure 3A:
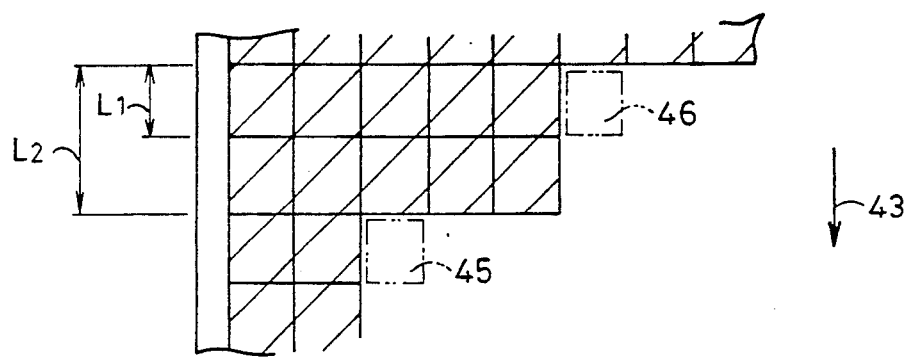
FIGS. 3A and 3B are diagrams for explaining smoothing processing in printing operation.
Figure 3B:
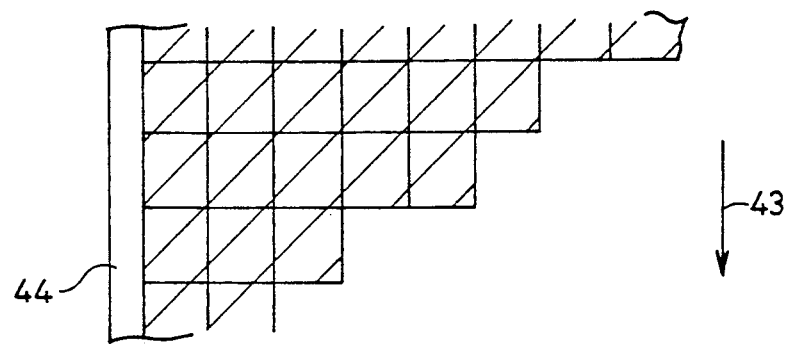

If smoothing processing is not performed as shown in FIG. 3A, the printing forms of the adjacent two lines would be the same since two printing operations are performed based on the same printing data in the standard mode. According to the present embodiment, the printing data correcting circuit 52 performs smoothing processing to print the areas shown by the virtual lines 45, 46 and thus printing can be made in natural form as shown in FIG. 3B.

As described above, according to this embodiment, correction of printing data such as smoothing processing as described above can be performed without using any special memory. Consequently, the manufacturing cost can be reduced without causing deterioration in printing quality and the size of the facsimile apparatus can be effectively made small.

Figure 17:
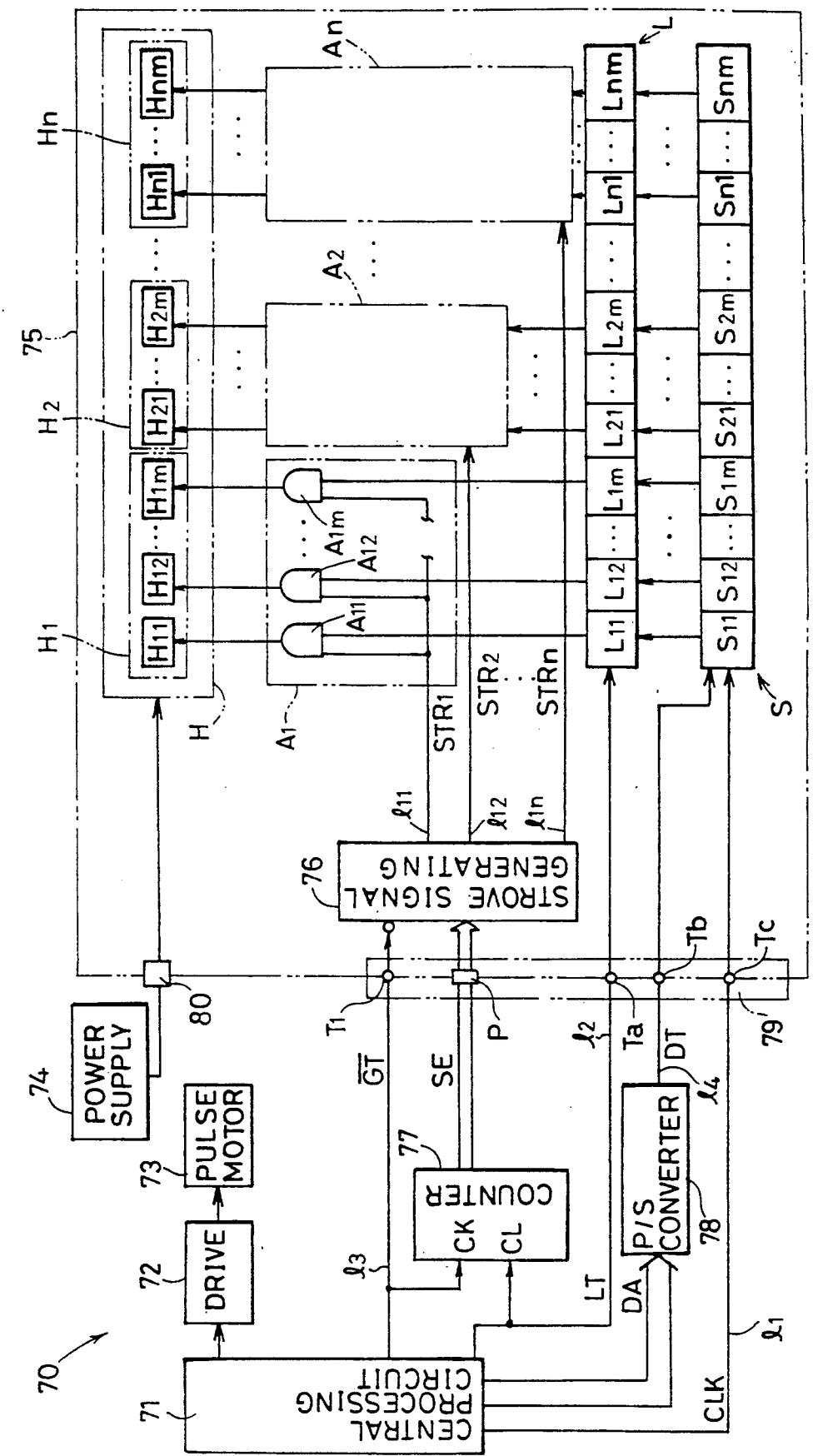
FIG. 17 is a block diagram showing a further embodiment of the present invention.

FIG. 17 is a block diagram showing a further embodiment of the present invention. In a facsimile apparatus shown in FIG. 17, the reader 23, operation panel 29, transmission control circuit 30 and so on shown in FIG. 5 are also provided but not shown. A printing unit 70 of this apparatus includes a printing head 75, to which a signal from a central processing circuit 71 or the like is supplied. The printing unit 70 further includes a drive circuit 72, a pulse motor 73 for feeding printing paper such as thermosensible paper, a parallel/serial (P/S) converter 78 and a counter 77. The printing head 75 is provided with a plurality of heating elements H11 to Hnm ($n=1, 2, \ldots; m=1, 2, \ldots$) as printing elements, and those heating elements H11 to Hnm are separated into a first plural number of, e.g., eight heating element groups H1 to Hn ($n=8$). The heating elements of those groups H1 to Hn are generally denoted by the reference character "H". The manner of separating the heating elements H into groups can be changed dependent on the size of printing paper for example. In FIG. 17, each heating element group $Hj$ ($j=1, 2, \ldots, n$) is assumed to have a prescribed number of, e.g. 256 heating elements Hj1 to Hjm ($m=256$) for the purpose of simplification and the printing head 75 in FIG. 17 is represented as an equivalent circuit in that case.

If printing is to be made on printing paper by the printing unit 70, printing data DA outputted from the central processing circuit 71 is supplied in 8-bit parallel form for example to the P/S converter 78. Printing data DT converted as a serial signal by the P/S converter 78 is supplied to the printing head 75 through a terminal Tb of a connector 79. The printing data DT is serial data of a logic "1" for example if it represents heating of the heating elements, and it is serial data of a logic "0" if it represents non-heating of the heating elements. This printing data synchronizes with the serial clock pulse CLK supplied from the central processing circuit 71 to the printing head 75 through a terminal Tc of the connector 79.

The printing unit 70 has a 3-bit counter 77 for example to generate a selection signal for selecting one of the heating element groups H1 to Hn. A signal $\overline{GT}$ is applied from the central processing circuit 71 to an input terminal CK of the counter 77 so as to perform counting operation. The signal $\overline{GT}$ is also applied to a terminal T1 of the connector 79. A 3-bit count value of the counter 77 is supplied to the printing head 75 as selection signals SE1 to SE3 (generally called "selection signal SE") through a port P of the connector 79. Further, the central processing circuit 71 supplies a latch signal LT to a terminal Ta of the connector 79 in connection with a latch circuit L described later. The latch signal LT is also supplied to an input terminal CL of the counter 77 to reset the counter 77. The drive circuit 72 drives the pulse motor 73 in response to a control signal from the central processing circuit 71, whereby the thermosensible paper or the like is fed according to timing of printing operation.

Next, the structure of the printing head 75 will be described in more detail. The printing head 75 includes a shift register S, a latch circuit L, logical product circuit groups A1 to An, heating elements H, and a strobe signal generating circuit 76. The printing data DT from the above-mentioned P/S converter 78 is supplied to the shift register S through the terminal Tb of the connector 79. The shift register S includes cells S11 to Snm corresponding to the heating elements H11 to Hnm, respectively, and it shifts the printing data DT successively in synchronization with the serial clock pulse CLK supplied from the central processing circuit 71 through the terminal Tc of the connector 79. Thus, printing data for one line is stored in the shift register S. The cells $Sji$ ($i=1, 2, \ldots, n$) of the shift register S are connected to the corresponding cells Lji of the latch circuit L.

The latch circuit L latches the printing data of the shift register S in response to the latch signal LT supplied from the central processing circuit 71 through the terminal Ta of the connector 79 and supplies the latched data to the logical product circuit groups A1 to An.

The strobe signal generating circuit 76 outputs strobe signals STR1 to STRn in response to the selection signal SE supplied from the port P of the connector 79. Thus, the strobe signal generating circuit 76 inverts a pulse signal determined by the signal $\overline{GT}$ and supplies the pulse signal thus inverted to the line selected in response to the selection signal SE supplied from the counter 77. Thus, the strobe signals STR1 to STRn are generated in the strobe signal generating circuit 76.

The above-mentioned logical product circuit groups A1 to An correspond to the heating element groups H1 to Hn, respectively, and each logical product circuit group Aj has a logical product circuit Aji corresponding to the heating elements Hij, respectively. One input terminal of each logical product circuit Aji receives a strobe signal STRi. The other input terminal of each logical product circuit Aji receives a signal supplied from the cell Lji of the latch circuit L corresponding to the logical product circuit Aji. An output of the logical product circuit Aji is supplied to the corresponding heating element Hji.

Each heating element Hji includes a switching element and a heating resistor for example, and when the output of the logical product circuit Aji is at high level, the switching element is rendered conductive. Each heating element Hji is connected to the power supply circuit 74 through the connector 80 and the heating resistor is activated and heated by electric power supplied from the power supply circuit 74 in the conducting state of the switching element.

Figure 18:
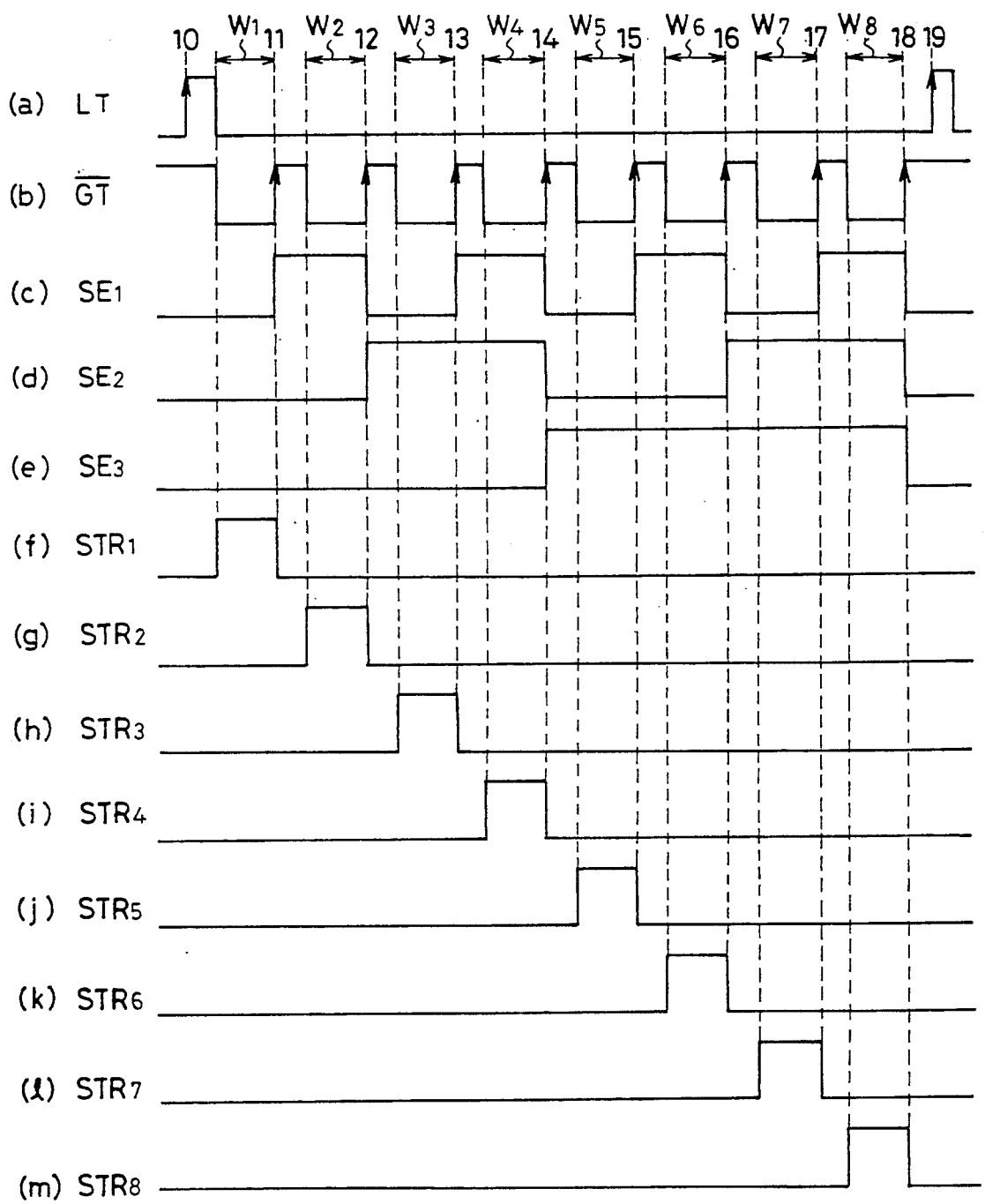
FIG. 18 is a timing chart of signals in the facsimile apparatus shown in FIG. 17.

FIG. 18 is a timing chart of the respective signals for explaining the operation timing of the printing head 75 shown in FIG. 17. Referring to FIG. 18, the operation of the printing head 75 shown in FIG. 17 will be described. The printing data stored in the shift register S is latched in the latch circuit L at rise of the latch signal LT shown in (a) of FIG. 18, namely, at time t0, and t9. At this time, the counter 77 is reset and accordingly the signals SE1 to SE3 supplied from the counter 77 attain low level as shown in (c) to (e) of FIG. 18. While the signals SE1 to SE3 are at low level, the signal $\overline{GT}$ shown in (b) of FIG. 18 is at low level in the period W1. Accordingly, as shown in (f) of FIG. 18, the strobe signal STR1 attains high level in this period W1. Thus, in the heating element group H1, the heating element H1i corresponding to the latched cell L1i at the logic "1" is heated.

At time t1, the signal $\overline{GT}$ rises and the counter 77 is incremented, so that the signal SE1 attains high level. In consequence, in the period W2 where the signal $\overline{GT}$ falls to low level, the strobe signal STR2 attains high level as shown in (g) of FIG. 18. At time t2, the signal $\overline{GT}$ rises and the counter 77 is further incremented, so that the signal SE1 attains low level and the signal SE2 attains high level. Thus, in the subsequent period W3 where the signal $\overline{GT}$ falls to low level, the strobe signal STR3 attains high level as shown in (h) of FIG. 18. Thus, the count value k (k=0, 1, ..., 7) of the counter 77 is successively incremented, and accordingly the strobe signal STRk+1 corresponding to the count value attains high level in the period Wk+1. The strobe signals STR1 to STR8 are as shown in (f) to (m) of FIG. 18.

Simultaneously with the printing operation in the printing head 75 as described above, storing of printing data of the next line into the shift register S is performed. As shown in (a) of FIG. 18, when the latch signal LT rises again at time t9, the printing data of the next line is latched in the latch circuit L and subsequently the same operation is repeated. Thus, printing operation for the plural lines are performed.

Figure 19:
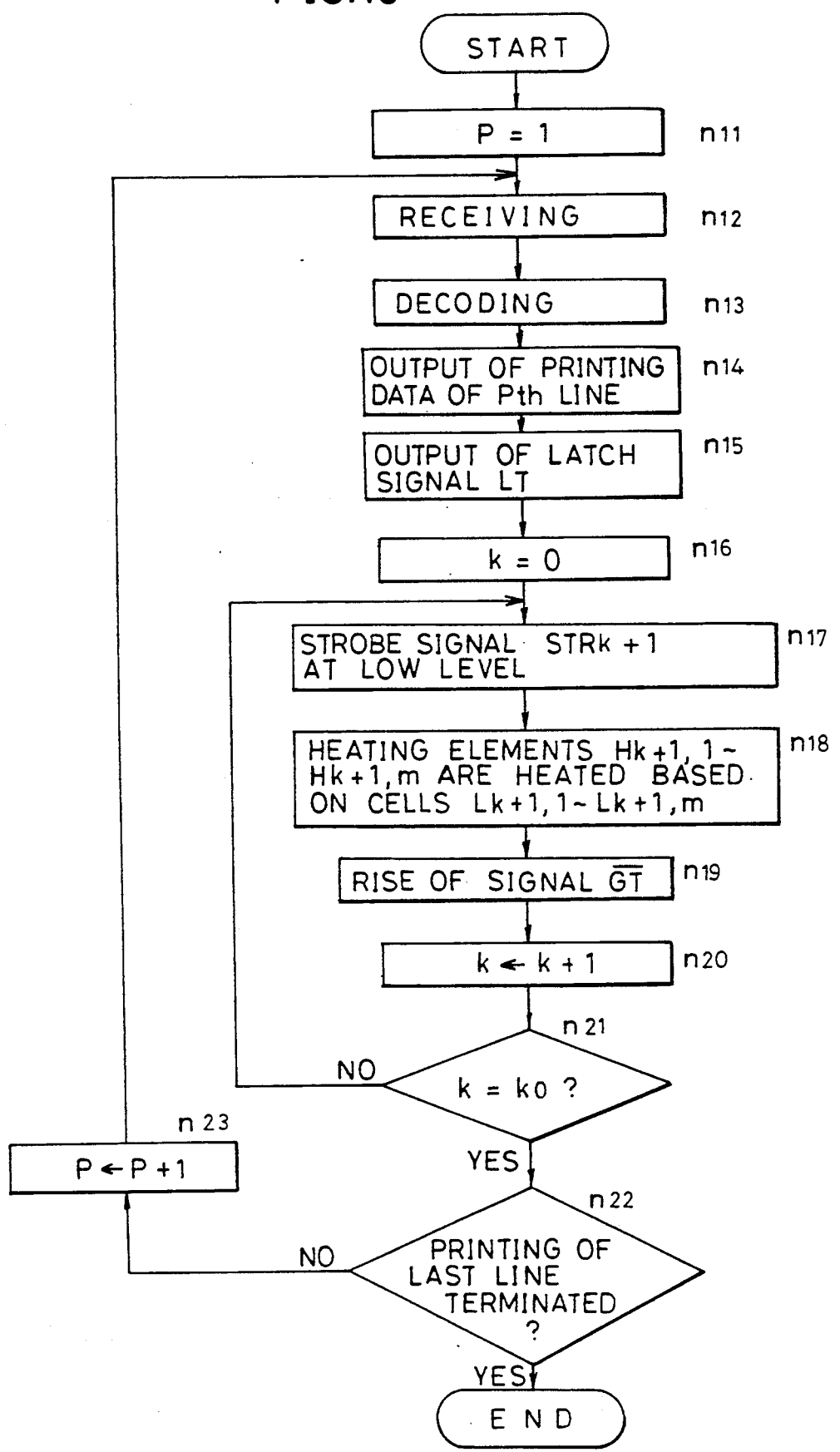
FIG. 19 is a timing chart for explaining operation of the facsimile apparatus shown in FIG. 17.

FIG. 19 is a flow chart for explaining the operation of the facsimile apparatus shown in FIG. 17. Next, referring to FIG. 19, the operation of the printing head 75 will be more specifically described. In step n11, a parameter p is initialized to p=1. When a call signal from other facsimile apparatus is detected and the telephone line T is connected thereto, image information of the pth line is received in step n12 after prescribed operation. The received image data is coded in step n13 and printing data of the pth line is supplied to the shift register S in synchronization with the serial clock pulse CLK in step n14. When the printing data of the pth line is stored in the shift register S, the latch signal LT rises in step n15, so that the printing data of the pth line is latched in the latch circuit L.

In step n16, at the rise of the latch signal LT, the count value k of the counter 77 is reset to "0". In step n17, the strobe signal STRk+1 attains high level in a period of low level of the signal GT. In step n18, in a period Wk of high level of the strobe signal STRk+1, the heating elements Hk+1,1 to Hk+1,m are heated according to the printing data in the cells Lk+1,1 to Lk+1,m of the latch circuit L, whereby printing operation by the heating element group Hk+1 is performed. After that, in step n19, the signal $\overline{GT}$ rises, so that the count value k of the counter 77 is incremented in step n20.

In step n21, it is determined whether printing operation by the heating element group Hk0 (in this case, k0=8) is terminated or not. If k≠k0, the program returns to step n17, so that the above-described operation is repeated. If k=k0, the program proceeds to step n22 to determine whether printing operation for the last line is terminated or not. If the printing operation for the last line is terminated, the value of the parameter p is incremented in step n23 and the thermosensible paper is fed for one line, and then the program returns to n12. If it is determined in step n22 that the printing for the last line is terminated, the telephone line T is disconnected after prescribed operation, whereby the printing operation is terminated.

As described above, according this embodiment, the strobe signals STR1 to STRn are generated in the printing head 75 and accordingly the number of signals to be inputted is decreased. More specifically, for example if the heating elements H are separated into eight groups, three selection signals SE1 to SE3 are supplied from the counter 77 to the printing head 75 and strobe signals STR1 to STR8 are generated in the printing head 75, which makes it possible to decrease signal lines. Thus, according to this embodiment, if the printing elements are separated into $2^n$ groups, it is only necessary to input n selection signals. Thus, the signal cable to the printing head 75 can be made thin and it is easy to mount the printing head 75 in the apparatus. At the same time, the structure of the connector 79 of the printing head 75 can be simplified.

The above-mentioned embodiments are related to the case in which the present invention is applied in connection with the line type thermal head provided in the facsimile apparatus. However, the present invention is not limited thereto. For example, the present invention is applicable to printing apparatus such as printers of computers or word processors, or video printers.

Figure 20:
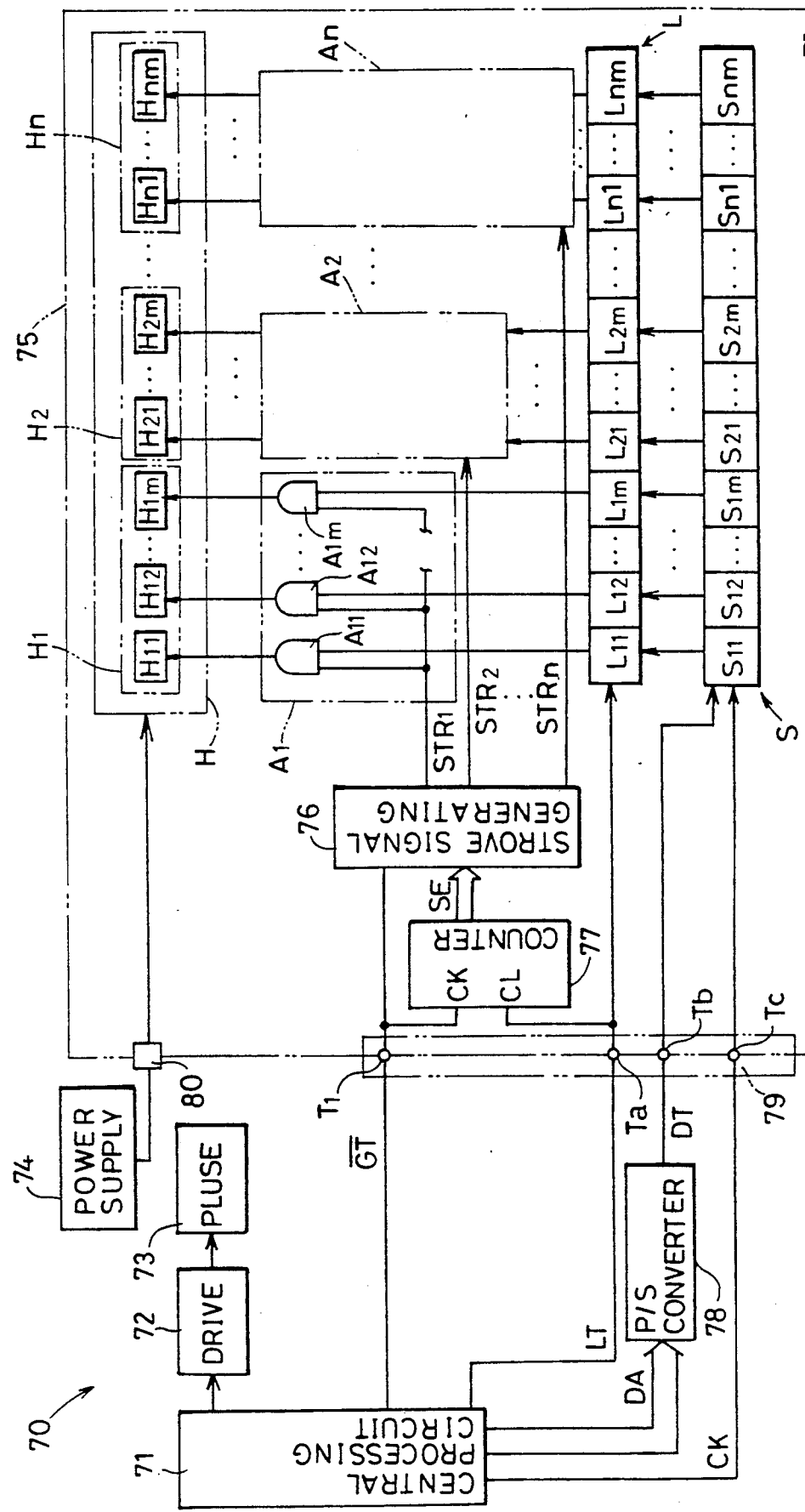
FIG. 20 is a schematic block diagram showing a still further embodiment of the present invention.

FIG. 20 is a schematic block diagram showing a still further embodiment of the present invention. According to this embodiment, a counter 77 as shown in the embodiment of FIG. 17 is provided in the printing head 75 and other structure is the same as that of FIG. 17. Thus, since the counter 77 is contained in the printing head 75, it is not necessary to input the selection signals SE1 to SE3 to the connector 79 and the number of signal lines can be further decreased.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A printing apparatus which prints an image by repeating two printing operations performed while feeding printing paper according to printing data for one line using a plurality of printing elements (H1 to Hn), comprising:
   printing data output means (28) for supplying first printing data;
   signal processing means (52) for applying signal processing to the first printing data supplied from said printing data output means and supplying second printing data obtained by the signal processing for each said printing operation; and
   register means (S) including storage areas corresponding to said plurality of printing elements, for storing the second printing data for one line supplied from said signal processing means,
   said signal processing means including means for applying signal processing to the first printing data supplied from said printing data output means, by referring to the printing data for one line supplied in response to shifting operation of said register means, and supplying the second printing data for one line for each said printing operation.

2. The printing apparatus in accordance with claim 1, wherein
   said signal processing means includes means for applying signal processing to the first printing data by referring to the first printing data one line ahead of said first printing data, supplied from said register means, and supplying said second printing data obtained by the signal processing.

3. The printing apparatus in accordance with claim 1, further comprising:
   storage means (53) for storing the second printing data supplied from said signal processing means and supplying said second printing data to said register means.

4. The printing apparatus in accordance with claim 1, wherein
   said plurality of printing elements are classified into a predetermined number of groups (H1 to Hn), said printing apparatus further comprising:
   drive signal generating means (71, 76, 77) for generating a drive signal for driving said printing elements corresponding to each of said groups; and
   drive means (A1 to An) for driving corresponding printing elements according to the printing data stored in the corresponding storage area of said register means in response to the drive signal generated from said drive signal generating means.

5. The printing apparatus in accordance with claim 4, further comprising:
   latch means (2) including storage areas corresponding to the respective storage areas of said register means, for latching the printing data stored in said register means, wherein
   said drive signal generating means includes means (71) for generating a latch signal for latch operation of said latch means, and
   said drive means includes means for driving the corresponding printing elements according to the printing data latched in the corresponding storage area in said latch means in response to the drive signal generated from said drive signal generating means.

* * * * *